J. M. PETERMAN.
CLOTHES LINE.
APPLICATION FILED JULY 3, 1908.
922,032.
Patented May 18, 1909.
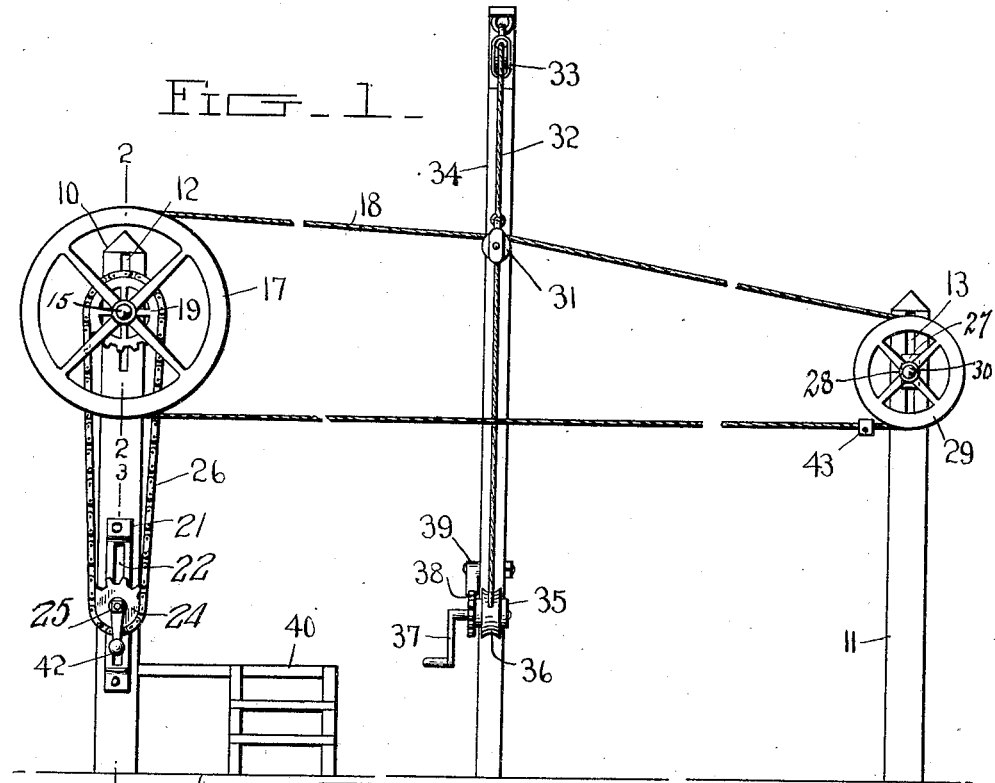
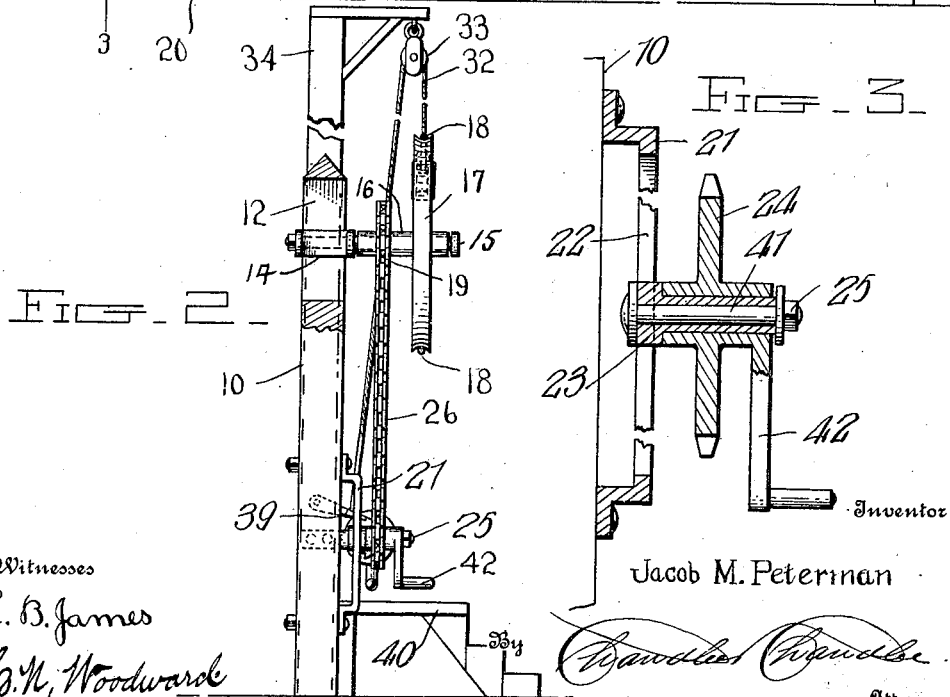
Witnesses
L. B. James
C. N. Woodward
Inventor
Jacob M. Peterman
By
Chandler Chandler
Attorneys

UNITED STATES PATENT OFFICE.

JACOB M. PETERMAN, OF NEW MARKET, IOWA.

CLOTHES-LINE.

No. 922,032.

Specification of Letters Patent.

Patented May 18, 1909.

Application filed July 3, 1908. Serial No. 441,809.

*To all whom it may concern:*

Be it known that I, JACOB M. PETERMAN, a citizen of the United States, residing at New Market, in the county of Taylor, State of Iowa, have invented certain new and useful Improvements in Clothes-Lines; and I do hereby declare the following to be a full, clear, and exact description of the invention, such as will enable others skilled in the art to which it appertains to make and use the same.

This invention relates to clothes lines of the form wherein the clothes line is endless and conducted over guide pulleys, and has for one of its objects to simplify and improve the construction and increase the efficiency and utility of devices of this character.

Another object of the invention is to provide a simply constructed device of this character wherein the carrier pulleys may be raised and lowered to dispose the line at a greater or lesser distance from the ground.

With these and other objects in view the invention consists in posts spaced apart at the ends of the area occupied by the line, each provided with a vertical slot, a pulley carrying device movable in each slot, clamping means whereby the pulleys may be supported at any desired point in the slots, an endless clothes line operating over the pulleys, an intermediate supporting device for maintaining the tension of the line, and a line operating means connected to one of the posts.

The invention further consists in certain novel features of construction as hereafter shown and described and then specifically pointed out in the claim, and in the drawings illustrating the preferred embodiment of the invention, Figure 1 is a side elevation of the improved device. Fig. 2 is a section on the line 2—2 of Fig. 1. Fig. 3 is a section on the line 3—3 of Fig. 1.

The improved device comprises two posts 10—11 located at opposite sides of the yard or other locality where the line is to be erected and operated, and may be of any required size, of any required height, and spaced at any distance apart according to the area which is available. The post 10 is provided at its upper end with a longitudinal slot 12, while the post 11 is provided with a similar slot 13.

Mounted for movement vertically in the slot 12 is a member 14 having a clamp bolt 15 whereby it may be clamped at any desired point in the slot. The member 15 is provided with a thimble 16 carrying a pulley 17 having a grooved periphery to carry the endless clothes line represented at 18, the thimble likewise carrying a sprocket wheel 19. By this means the thimble may be clamped at any desired point upon the post within the range of the slot 12 and thus locate the pulley 17 at any desired point above the ground represented at 20.

Attached to the post 10 relatively near the ground is a bracket 21 having a vertical slot 22 at its outer end corresponding to the slot 12 of the post 10, and mounted for vertical movement in this slot 22 is a block 23 from which a bearing extends to receive the hub of a sprocket wheel 24, and extending through this block and its bearing is a clamp bolt 47 having a head on its inner end extending over the inner faces of the bracket 21 and with a clamp nut 25 at its outer end. The hub of the wheel 24 is provided with an operating crank 42. By this means the block 23 and its bearing may be clamped to the bracket 21 at any desired point within the range of the slot 22, and thus cause the chain represented at 26 to operate over the chain wheels 19—24—. By this arrangement the wheels 17—19 may be adjusted correspondingly with the wheel 24 so as to maintain the chain 26 at a uniform tension or to increase the tension by moving one of the pulleys to a greater extent than the other.

Mounted for vertical movement in the slot 13 is a member 27 having a sleeve 28 carrying a pulley 29 having a grooved rim, a clamp bolt 30 passing through the member 27 and enabling the latter to be firmly clamped at any desired point in the slot, so that the pulley 29 may be adjusted vertically relative to the post, as will be obvious. The endless line 18 passes around the two pulleys 17—29 as shown.

Supported centrally of the endless line 18 is a carrier pulley or sheave 31, the carrier sheave supported by a cable 32 passing over a guide sheave 33 supported from a frame 34, the latter rising from the ground 20 and provided with a bracket 35 carrying a winding windlass 36, the latter provided with an operating crank 37, and a ratchet wheel 38 with which a pawl 39 engages. By this simple means the rotation of the crank 37 will elevate the carrier sheave 31 and thus maintain the belt in proper strained position to keep it taut as will be obvious.

Connected to the post 10 is a platform 40 on which the laundress stands while attaching the clothes to the line, and previous to doing this work the pulleys 17—29 are lowered to bring the lower portion of the endless line in the proper location relative to the person standing upon the platform. The laundress then suspends the clothes from the portion of the line within reach and then rotates the crank 42 to move the line along for another portion and then fills this new portion with the clothes and so on until the clothes already on the line reach nearly to the post 11. To prevent the undue movement of the line and injury to the clothes a stop 43 is connected to the line 18 against which the first garment placed upon the line engages and thus notifies the operator that the line is full.

The device is simple in construction, can be inexpensively manufactured, and erected at any required point and adapted to the sizes of the locality or space in which it is to be erected.

By employing the suspension device 31 lines of almost any length may be employed as will be obvious.

What is claimed, is:—

In a device of the class described, two posts spaced apart and provided with longitudinal slots, clothes line guide pulleys adjustably mounted in said slots, means for clamping said guide pulleys in said slots, an endless clothes line engaging said pulleys, a suspension device intermediate the pulleys and operating beneath the upper portion of the endless line, means for adjusting said suspension device vertically, a bracket carried by one of said posts and provided with a vertical slot, a sprocket wheel mounted adjustably in the slot of said bracket, a sprocket wheel mounted for adjustment with one of said line guide pulleys, and an endless chain operating over said sprocket wheels.

In testimony whereof, I affix my signature, in presence of two witnesses.

JACOB M. PETERMAN.

Witnesses:
H. E. TOMLINSON,
T. J. SNODGRASS.